United States Patent
Heine et al.

(10) Patent No.: US 9,633,237 B2
(45) Date of Patent: Apr. 25, 2017

(54) SYSTEM AND METHOD FOR TRACKING USAGE OF ITEMS AT A WORK SITE (75) Inventors: Christian P. Heine, Arlington Heights, IL (US); Mahendra P. Srivastava, Duluth, GA (US); James D. Bohn, Bristol, WI (US); Teresa Celmer, Bartlett, IL (US)

(73) Assignees: Robert Bosch Tool Corporation, Broadview, IL (US); Robert Bosch GmbH, Stuttgart (DE); Sortimo International GmbH, Zusmarshausen (DE)

( * ) Notice: Subject to any disclaimer, the term of this patent is extended or adjusted under 35 U.S.C. 154(b) by 820 days.

(21) Appl. No.: 13/604,849

(22) Filed: Sep. 6, 2012

(65) Prior Publication Data

US 2014/0062699 A1    Mar. 6, 2014

(51) Int. Cl.
H04Q 5/22       (2006.01)
G08B 13/14      (2006.01)
G06K 7/10       (2006.01)
G06Q 10/08      (2012.01)

(52) U.S. Cl.
CPC ....... G06K 7/10009 (2013.01); G06Q 10/087 (2013.01)

(58) Field of Classification Search
CPC ........ G06K 2017/0051; G08B 13/2485; G08B 13/2462; G08B 13/2417; G08B 21/0275; G06Q 10/087; G06Q 10/08; G06Q 20/203; G06Q 50/22; G06Q 50/28; G06Q 10/083
USPC ................................ 340/572.1, 545.6, 10.51
See application file for complete search history.

(56) References Cited

U.S. PATENT DOCUMENTS

| | | | |
|---|---|---|---|
| 7,034,683 B2 | 4/2006 | Ghazarian | |
| 7,225,981 B2 | 6/2007 | Jongebloed | |
| 7,246,706 B1* | 7/2007 | Shakes et al. | 209/630 |
| 7,359,762 B2 | 4/2008 | Etter et al. | |
| 7,641,104 B1* | 1/2010 | Leon et al. | 235/375 |
| 7,654,456 B2 | 2/2010 | Roewer | |
| 7,750,811 B2 | 7/2010 | Puzio et al. | |
| 7,969,306 B2 | 6/2011 | Ebert et al. | |
| 8,040,221 B2 | 10/2011 | Murray et al. | |

(Continued)

FOREIGN PATENT DOCUMENTS

EP         0706770 A2     4/1996

OTHER PUBLICATIONS

International Search Report and Written Opinion corresponding to PCT Application No. PCT/US2013/058481, mailed Mar. 28, 2014 (13 pages).

(Continued)

*Primary Examiner* — Emily C Terrell
(74) *Attorney, Agent, or Firm* — Maginot, Moore & Beck LLP (57) ABSTRACT

A method tracks usage of items stored in containers. To perform the method, a sensor in a mobile electronic device receives data identifying a type of item stored in a container and a number of the type of item present in the container from a tag associated with the container. A user interface in the mobile electronic device generates a prompt requesting entry of a count of the items removed from the container. The sensor in the mobile electronic device generates a revised number of the items stored in the container and stores the revised number in the tag.

15 Claims, 7 Drawing Sheets

(56) References Cited

U.S. PATENT DOCUMENTS

| | | |
|---|---|---|
| 2002/0161651 A1 | 10/2002 | Godsey et al. |
| 2004/0069850 A1 | 4/2004 | De Wilde |
| 2005/0283404 A1* | 12/2005 | Young ............................. 705/22 |
| 2007/0200664 A1 | 8/2007 | Proska et al. |
| 2007/0296596 A1 | 12/2007 | Moore |
| 2008/0082429 A1* | 4/2008 | Stein et al. .................... 705/28 |
| 2008/0157967 A1* | 7/2008 | Jones et al. ................ 340/572.1 |
| 2008/0188178 A1 | 8/2008 | Maugars et al. |
| 2008/0228346 A1 | 9/2008 | Lucas et al. |
| 2008/0231451 A1* | 9/2008 | Kamel ...................... 340/572.1 |
| 2009/0189743 A1 | 7/2009 | Abraham et al. |
| 2010/0019905 A1 | 1/2010 | Boddie et al. |
| 2010/0187306 A1 | 7/2010 | Solomon |
| 2010/0265061 A1 | 10/2010 | Harmon et al. |
| 2011/0087565 A1 | 4/2011 | Fan et al. |
| 2011/0246215 A1 | 10/2011 | Postma et al. |
| 2011/0246219 A1 | 10/2011 | Smith et al. |
| 2012/0166241 A1 | 6/2012 | Livingston et al. |
| 2012/0169468 A1 | 7/2012 | Butler et al. |
| 2012/0191566 A1 | 7/2012 | Sayan |
| 2012/0197768 A1* | 8/2012 | Hurtis et al. .................... 705/28 |
| 2012/0200385 A1 | 8/2012 | Savage et al. |

OTHER PUBLICATIONS

Ford F-150 Equipped with DeWalt and ThingMagic "Tool Link" http://www.xconony.com/boston/2008/02/07/no-more-lost-tools-for-an . . . , Feb. 7, 2008 (3 pages).

Ford DeWalt Tool Tracking, It's 5 O'Clock do you Know Where Your Tools are/226 Cell Phones & Mobile Device Technology News & Updates, Geek.com, Aug. 7, 2009 (10 pages).

User Guide, Document #875-0021-01, Published 2008 (39 pages).

Sortimo website page, "The New LS-BOXX," published at least as early as Aug. 13, 2012 (6 pages).

Sortimo website page, "Mobile Assortments," published at least as early as Aug. 13, 2012 (49 pages).

* cited by examiner

SYSTEM AND METHOD FOR TRACKING USAGE OF ITEMS AT A WORK SITE

TECHNICAL FIELD

This disclosure relates generally to item storage, inventory tracking, and inventory management systems, and, more specifically, to systems and methods for tracking the number of items stored in containers at work sites.

BACKGROUND

Workers in a wide range of industries, including construction workers, plumbers, electricians, telecommunication service personnel, and HVAC service personnel often travel to work sites to participate in work projects. Since the work sites often lack the tools and supplies required to complete a project, these personnel often carry some or all of the necessary equipment in a vehicle, such as a van or work truck, to the work site. For example, a work truck often carries a wide range of tools from hammers and screwdrivers to power tools including drills, saws, belt sanders, nail drivers, and the like. Tools can include further components, such as batteries, replaceable drill bits, saw blades, sanding pads, and the like, which may require occasional replacement during a job. Additionally, the work truck often includes a wide range of consumables, such as nuts, bolts, washers, screws, nails, lumber, pipe, wire, and the like, which typically remain on the work site as part of the finished project. Consumables can further include items, such as water, sunscreen, stock for portable restrooms, and other products, which are consumed at the work site.

Proper organization of tools and consumables in a work vehicle and on the work site enables professionals to operate more efficiently. For example, a properly organized tool system enables a worker to find an appropriate tool for a task, such as a power screwdriver, the screws properly sized to secure two structures to one another, and a screwdriver bit that fits the power screwdriver and mates with the selected screws. If any one of these items cannot be efficiently located, then time is wasted searching for the correct components to perform the task.

An example of an organizational system that enables efficient storage and access to tools and consumables is sold commercially as the Globelyst System from Sortimo International GmbH of Zusmarshausen, Germany. The Globelyst System includes a modular system of shelving and rails that holds a plurality of storage containers, which are sold commercially as L-Boxxes by Sortimo and by Robert Bosch GmBH of Stuttgart, Germany. The individual L-Boxxes lock together and engage shelves and rails in the Globelyst System to enable organization and storage of the L-Boxxes in a secure manner in the vehicle during transport. The L-Boxxes are optionally removable for convenient transport between the vehicle and the work site. The molded inserts in the L-Boxxes enable secure storage and organization of power tools within the L-Boxxes. Due to the modular design of the Globelyst System and L-Boxxes, the work vehicle can store a wide variety of different tool and consumable loads to accommodate the requirements of different projects. While the Globelyst System is described for illustrative purposes, various other organizational systems including one or more containers, shelves, and drawers are known to the art for storage and organization of tools and consumables at a work site.

While the existing storage containers can provide organization for storing and organizing tools and consumables, the management of tools and consumables often go beyond storage and organization. For example, tracking the use of many smaller consumable items including, but not limited to, nails, screws, nuts, bolts, and washers can be difficult when working at a job site. Imprecise tracking of the small components can lead to errors in provisioning work vehicles with the consumables and result in inefficient purchasing of consumable items. For example, a contractor may order too much of one type of consumable but not order enough of another type of consumable because of inefficient tracking of how the different types of consumable items are used at a work site. Further, failure to track the use of many small consumables can lead to a consumable being exhausted on the work site, which can result in work being suspended until additional stocks of the consumable are obtained. Thus, improvements to tracking the usage of consumables at a job site would be beneficial.

SUMMARY

In one embodiment, method for tracking usage of items has been developed. The method includes receiving, with a sensor in a mobile electronic device, data identifying a type of item stored in a container and a number of the type of item present in the container from a tag associated with the container, generating, with a user interface in the mobile electronic device, a prompt identifying the type of item and requesting entry of a count of the type of item for removal from the container, receiving, from the user interface, the count of the type of item, and storing in the tag, with the sensor in the mobile electronic device, a revised number of the type of item present in the container, the revised number being identified with reference to the count received from the user interface and the number of the type of item present in the container received from the tag.

In another embodiment, a system for tracking usage of items has been developed. The system includes a container configured to hold a type of item, a tag affixed to the container and configured to store data corresponding to the type of item stored in the container, and a mobile electronic device having a processor and memory. The mobile electronic device includes a software application program includes programmed instructions stored in the memory of the mobile electronic device that the processor executes to operate the mobile electronic device to, receive, with a sensor in a mobile electronic device, data identifying the type of item stored in the container and a number of the type of item present in the container from the tag, generate, with a user interface in the mobile electronic device, a prompt identifying the type of item and requesting entry of a count of the type of item for removal from the container, receive, from the user interface, the count of the type of item, and store in the tag, with the sensor, a revised number of the type of item present in the container, the revised number being identified with reference to the count received from the user interface and the number of the type of item present in the container received from the tag.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

As used herein, the term "mobile electronic device" refers to any electronic device that is configured to read tags associated with containers for tracking the usage of items stored in the containers at a work site. Examples of mobile electronic devices include, but are not limited to, smartphones, tablets, notebook computers, and the like. Another example of a mobile electronic device is a wearable computing device, such as a computing device that is integrated with a pair of glasses or other articles of clothing. The wearable computing device includes one or more sensors that read and write data to tags. Still another example of a mobile electronic device is an in-vehicle computing system that displays information retrieved from tags. In some configurations, the in-vehicle computing system includes one or more tag sensors in the vehicle to read and write data to tags, while other configurations include a display, such as a dashboard display, to enable a user to view tag data retrieved using another mobile electronic device such as a smartphone. The mobile electronic devices use a combination of hardware and software to read and write data to a memory in each tag, and to communicate with an inventory management server via a wireless data network.

As used herein, the term "tag" refers to any device or article that is affixed to a container or tool to store data about items held in the container or about the tool. The tag stores data in a format that is readable by one or more mobile electronic devices. One type of tag includes a radio transponder with an integrated memory. Examples of radio transponder tags include radio frequency ID (RFID) and near field communication (NFC) tags. The radio transponder tags can store data that are read by a radio transceiver in the mobile electronic device. Some forms of radio transponder tags include a writeable memory that stores data transmitted from the radio reader in the mobile electronic device during a data write operation in addition to providing stored data to the mobile electronic device during a data read operation.

NFC tags operate using a short-range wireless communication signal, typically over a distance of several centimeters between a tag reader and a passive NFC tag that does not include a battery or independent power source. Active NFC tags include a battery or other independent power source and can communicate over longer distances. Typical NFC tags and tag sensors operate, for example, at 13.56 MHz with an over-the-air communication interface defined by the ISO/IEC 18000-3 standard. Typical NFC data transmission rates ranging from, for example, 106 kbit/s to 424 kbit/s. In general, NFC tags operate at lower radio frequencies than other forms of passive RFID that typically operate in the hundreds of megahertz or gigahertz frequency bands.

Figure 1:
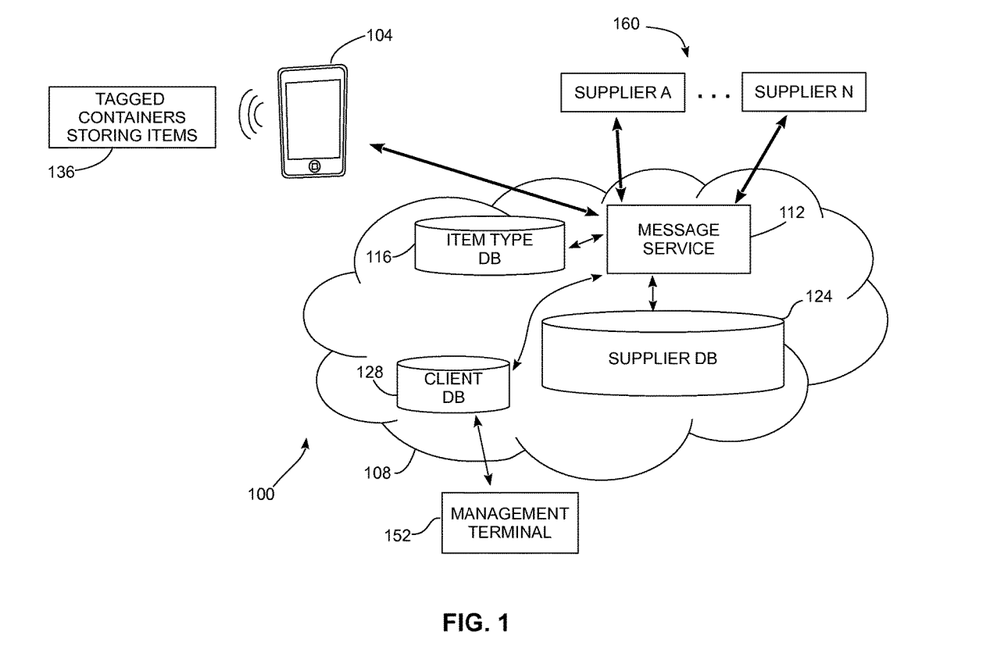
FIG. 1 is a schematic diagram of an inventory management and resupply system for consumables, tools, and tool components.

FIG. 1 depicts an inventory management system 100 that enables resupply of consumables, tools, and components for tools with a mobile electronic device in conjunction with tags associated with the consumables, tools, and components. The system 100 includes at least one mobile electronic device 104, an inventory management server 108, an optional management terminal 152, a plurality of tagged containers holding items 136.

Figure 4:
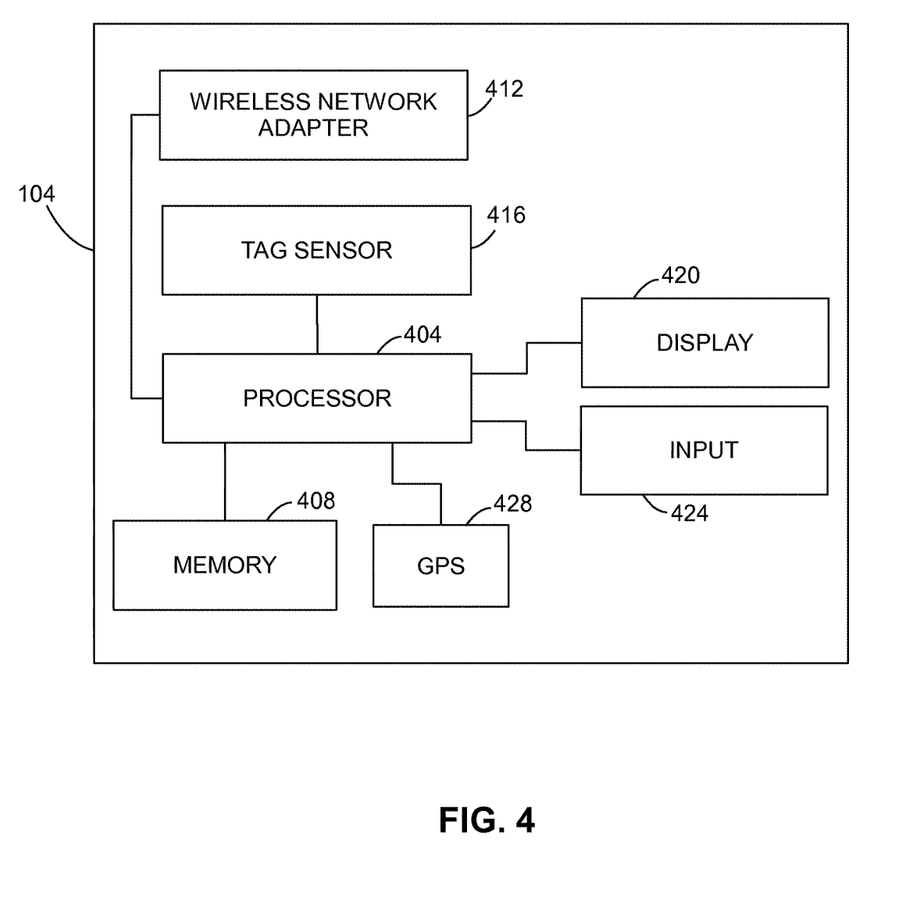
FIG. 4 is a schematic diagram of components in a mobile electronic device that is configured to operate with the system depicted in FIG. 1.

FIG. 4 depicts the mobile electronic device 104 in more detail. The mobile electronic device 104 includes a processor 404, memory 408, wireless network adapter 412, tag sensor 416, a display device 420, input device 424, and an optional global positioning system (GPS) receiver 428. The processor 404 includes one or more central processing units (CPU), graphical processing units (GPU), digital signal processors (DSP), field programmable gate arrays (FPGA) and application specific integrated circuit (ASIC) devices. The processor 404 reads and writes data from the memory 408. The memory 408 includes a non-volatile data storage device, such as solid state data storage, for long-term storage of data and instructions for software application programs, which include operating system software and software application programs that read tags, store revised item numbers in the tags to track item use, and communicate with the inventory management server 108. In some embodiments, the memory 408 includes volatile data storage devices, such as static or dynamic random access memory (RAM), for short-term data storage during operation. In the mobile electronic device 104, the processor 404 and other components including the memory 408, wireless network adapter 412, tag sensor 416, and GPS receiver 428 can be integrated into a single device in a system on a chip (SoC) configuration.

In the mobile electronic device 104, the processor 404 is operatively connected to the tag sensor 416. In one configuration, the tag sensor 416 is a radio transceiver that activates a radio transponder in a tag when the tag sensor 416 is held in close proximity to the tag. The tag sensor 416 radiates a small amount of energy to provide power to the tag inductively through an antenna coil connected to the radio transponder in the tag, although some tag embodiments include an independent power source. The tag sensor 416 includes a radio transceiver that receives data stored in the tag. In some configurations, the radio transceiver in the tag sensor 416 sends data to the radio transponder in the tag as part of a query for information stored in the tag or to store new data in the tag memory.

In the mobile electronic device 104, the wireless network adapter 412 is operatively connected to the processor 404 and includes a combination of hardware and/or software modules to enable communication using one or more wireless data networks, which can include wireless wide area networks (WWAN) and wireless local area networks (WLAN). The wireless network adapter 412 enables the mobile electronic device 104 to communicate with the inventory management server 108 in the system 100. For example, the wireless network adapter 412 sends item tracking update messages to the server 108 indicating the types of items withdrawn from the containers 136 and revised counts of the number of items in the containers 136, and receives order confirmation messages from the inventory management server 108.

The mobile electronic device 104 includes a display 420 and input device 424 to enable interaction with an operator in possession of the mobile electronic device 104. The display 420 typically includes a liquid crystal display (LCD) or organic light emitting diode (OLED) output panel that displays graphics, text, and other visible indicia associated with data read from tags and with prompts to enter the number of items to be withdrawn from containers. The input devices 424 include, but are not limited to, touch screen inputs, virtual and physical keyboards, mice, speech input and recognition systems, and the like. The input device 424 enables the operator to enter a number of items for withdrawal from the containers 136 to enable accurate tracking of item usage in the system 100.

In the mobile electronic device 104, the optional GPS receiver 428 generates geolocation data for the mobile electronic device 104 using the Global Positioning System or an equivalent such as Galileo or GLONASS. The GPS receiver 428 generates the geolocation data with a high degree of precision. In conjunction with mapping software programs or online services, the processor 404 can automatically identify an estimated street address of the mobile electronic device 104 for identifying the relative distance from a work site to multiple suppliers and placing orders without requiring manual input of the delivery address. In embodiments that omit the GPS receiver 428 or in situations where the GPS receiver 428 is inoperable, the mobile electronic device 104 receives geolocation data using with the wireless network adapter 412 using, for example, network location services or triangulation. The geolocation data received with the wireless network adapter 412 often has less precision than the data from the GPS 428, but the precision of the geolocation data is sufficient to enable identification of a relative distance between the mobile electronic device 104 and multiple suppliers.

Referring again to FIG. 1, the inventory management server 108 includes hardware and software to implement a message service 112, item type database (DB) 116, supplier DB 124, and client DB 128. In FIG. 1, the server 108 includes multiple hardware computing devices in a clustered configuration to provide scalability and fault tolerance, but a single computing device implements the functionality of the server 108 in another embodiment. The databases and services implemented in the inventory management server 108 and the operation of the inventory management server 108 are described in more detail below.

In the inventory management server 108, the message service 112 is communicatively coupled to both the mobile electronic device 104 and to one or more suppliers 160 through a data network, such as the Internet. The message service 112 receives item tracking messages from the mobile electronic device 104 that include identifying information for the types of items that are removed from the containers, and the quantity of items removed from the containers or total number of items remaining in the containers after items are withdrawn. The message server 112 also places orders for additional items to replenish the containers 136, and the message service 112 sends confirmation messages to the mobile electronic device 104 indicating the type and quantity of item that were ordered for storage in the memory of the tag associated with the appropriate container.

The item type DB 116 includes one or more tables or other appropriate data structures organized in a memory that map identification data associated with one or more types of items that are stored in the containers 136 to identifiers for the different types of item that correspond with one or more suppliers. For example, when the message service 112 receives a message from the mobile electronic device 104 indicating that a consumable has been withdrawn from a container, the inventory management server 108 can generate an order to replenish the consumable item. The item type DB 116 includes one or more identifiers for the consumable item that are compatible with at least one of the suppliers 160. For example, a stainless steel quarter-inch bolt is identified with a first numeric identifier "1234." The item type DB 116 identifies the bolt with the numeric identifier in the list and can identify that three different suppliers A, B, and C associate the bolt with a different stock-keeping unit (SKU) identifier for each of the respective suppliers. As described below, the message service 112 uses the SKU number or other identifier recognized by one of the suppliers when placing an order with the one supplier.

The supplier DB 124 stores data corresponding to the multiple suppliers 160. The suppliers DB 124 includes one or more tables or appropriate data structures for identifying the supplier locations and supplier interface data that enable the message service 112 to communicate with online inventory and ordering systems for each of the suppliers 160. The supplier DB 124 also includes location data corresponding to the suppliers 160. The location data include geolocation data (e.g., latitude/longitude of supplier locations) and/or street addresses of the suppliers 160. In terms of location data for a supplier, a single supplier can simply be a single store at a single location. Other suppliers, however, include multiple stores at multiple locations. For example, a large national hardware store chain stored in the supplier DB 124 can include hundreds or thousands of locations. For purposes of location identification, the individual locations of the hardware store chain are identified by both the overall identity of the supplier and individually with each store location being a separate supplier.

In the server 108, the message service 112 sends geographic information in the supply database to the mobile electronic device 104 in response to a supplier location query. In one configuration, the query includes location data corresponding to the identified location of the mobile electronic device 104 and a request for supplier locations within a predetermined distance of the mobile electronic device. The query can further include a list of supplier identifiers to filter the results. For example, if Chain A and Chain B each have two locations within 15 miles of the mobile electronic device, but the query specifies that only Chain A locations should be returned to the mobile electronic device, then the message service 112 returns data from the supplier DB 124 for only the two Chain A locations. Additionally, the message service 112 omits a location of Chain A that is located 20 miles from the mobile electronic device from the query results that are returned to the mobile electronic device 104.

The supplier DB 124 also includes supplier service interface data that are required for the message service 112 to generate item availability queries and orders with remote servers associated with the suppliers 160. For example, different suppliers typically implement different data services for checking the availability of different type of items, and implement different services for placing orders. The services are often not completely compatible between the different vendors 160. The supplier DB 124 includes data, such as hypertext markup language (HTML) and extensible markup language (XML) templates, web service interface data, JavaScript application program interface (API) data, and any other data, required to interface with the inventory and ordering system for each of the vendors 160.

The client DB 128 includes tables or other appropriate data structures corresponding to the owner of the tagged containers 136. The client DB 128 stores data corresponding to the number of each type of item stored in each of the containers 136. The number of items in the containers 136 change as items are withdrawn from the containers 136 or when the containers 136 are replenished with items. As described below, the mobile electronic device 104 sends messages to the inventory management server 108 including messages containing a revised number of items stored in each container when the items are removed for use at a worksite. Further, the inventory management server 108 sends confirmation messages to the mobile electronic device 104 in response to ordering additional items for the containers 136, and the revised number of items is stored in the client DB 128 to maintain an accurate account of the number of each type of item in the containers 136. In the system 100, the client DB 128 optionally stores additional information including lists of acceptable suppliers for different types of items in the item type DB 116 and payment information data, such as credit card information, used to place orders with one or more of the suppliers 160.

An external management terminal 152, such as a personal computer (PC), smartphone, or tablet, enables a manager to communicate with the server 108 to view data in the client DB 128. These data include the current number of items stored in each container and a history of item levels in the containers. In one configuration, the management terminal 152 receives reports corresponding to the usage of each type of item in the work site, which can be used for generation of billing information and for auditing the usage of items at the work site. In particular, the client DB 128 stores the number of each type of item that should be present in each of the containers, and the tag affixed to each container should correspond to the number stored in the DB 128. If a physical audit of the container indicates the actual number of parts in the container does not correspond to the number of parts that was stored in the client DB 128, then the management terminal 152 can review a history of recorded item withdrawals to identify when items were misplaced or improperly removed. In the system 100, the server 108 implements a web server portal to enable the management terminal 152 to access the client DB 128 and other functionality of the server 108 using a web browser software program.

Figure 2:
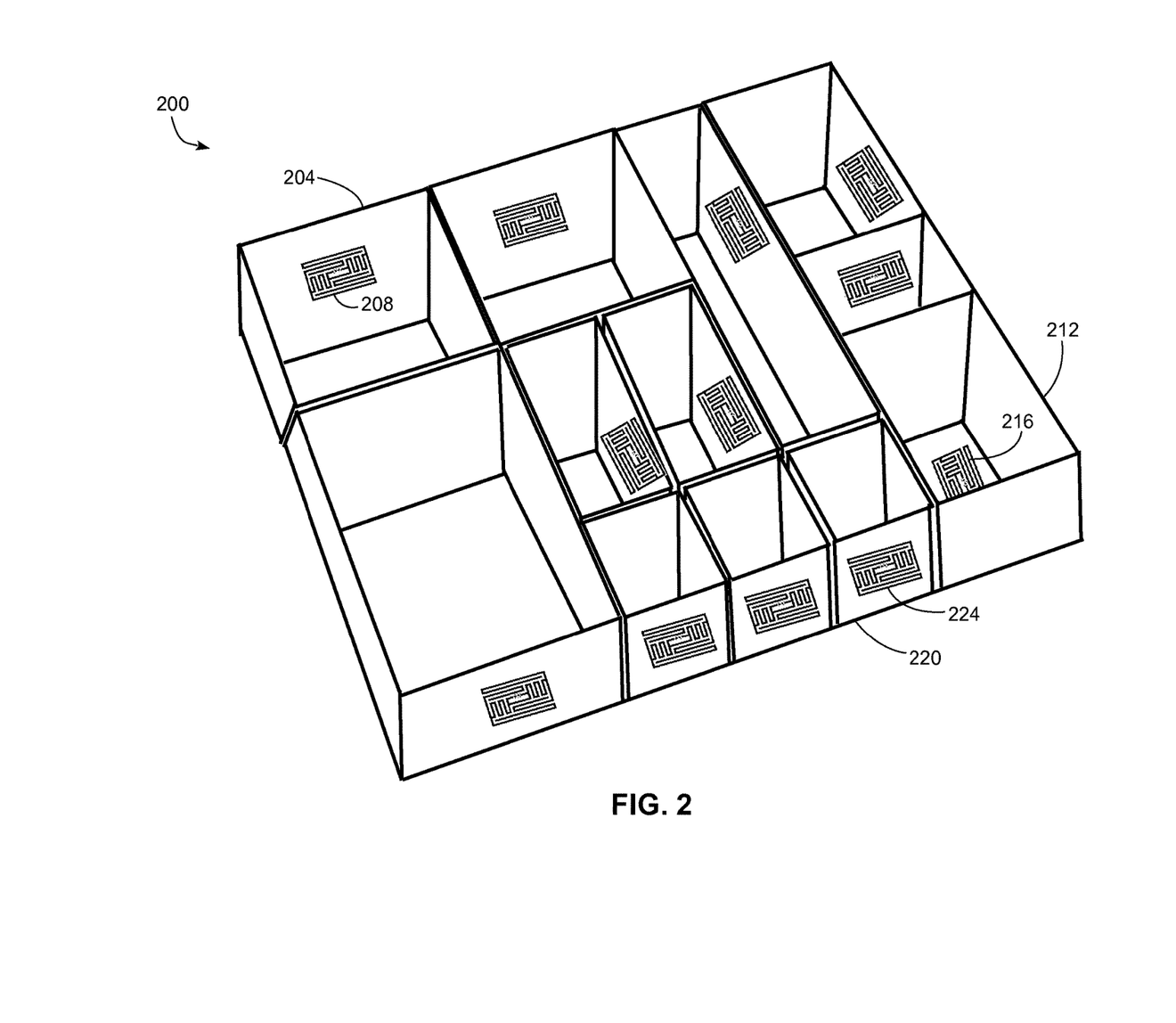
FIG. 2 is a perspective view of a plurality of containers that are configured to store different consumables and that include tags storing data about the consumables.

Referring to FIG. 2, different types of items in the system 100 are stored in a plurality of containers 136 that are associated with tags to enable the mobile electronic device 104 to identify the contents of each container in an automated manner. FIG. 2 depicts one example of a plurality of tagged containers 200. In FIG. 2, a set of individual containers 200 fit together into a rectangular arrangement. The containers 200 can be further stored in a larger container, such as a case, for convenient storage and transportation. Each container holds a quantity of a single type of consumable item such as, for example, nuts, bolts, washers, nails, screws, and the like, although a wide range of items can be stored in each container. While the containers 200 are formed with rectangular shapes, other cases are formed with a variety of different geometries to store different items.

In FIG. 2, a tag is affixed to each of the containers 200. For example, a tag 208 is affixed to an inner surface of a wall in the container 204. In the embodiment of FIG. 2 the tag 208 is held in a sleeve or other mounting feature in the container 204 and can be replaced with another tag if the container 204 is repurposed to store a new item. In another configuration, the tag 208 is permanently affixed to the container 204 and the tag 208 is reprogrammed using, for example, the mobile electronic device 104 if the container 204 is repurposed to store a new item. The tag 208 is a radio transponder tag, such as an RFID or NFC tag, with a wire coil antenna that is electrically connected to a radio transponder and associated microelectronics, including a memory. In addition to storing data identifying the item stored in container 204, the tag 208 also includes identifiers for one or more suppliers that are approved for use when ordering the item held in the container 204. In the plurality of containers 200, the tags are affixed to different locations in various individual containers. For example, a tag 216 is located on the floor of the container 212 and another tag 224 is located on an external wall of the container 220.

Figure 3:
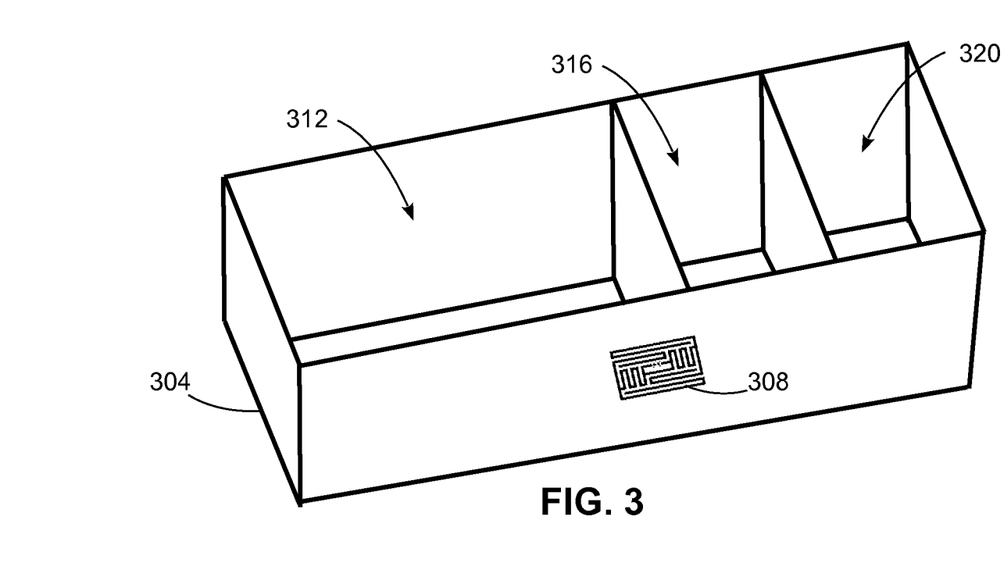
FIG. 3 is a perspective view of a container that is configured to store three different consumables and a single radio frequency tag that stores data about each of the three consumables.

In FIG. 2, each container in the plurality of containers 200 stores a single type of consumable item. FIG. 3 depicts a container 304, which stores multiple types of items in sub-containers and includes a single tag that stores data for the items in each of the sub-containers. In FIG. 3, the container 304 includes three sub-containers 312, 316, and 320. Each sub-container stores a single type of consumable item, such as, for example, bolts in the container 312, washers in the container 316, and nuts in the container 320. A single tag 308 affixed to the container 304 stores data identifying each of the bolt, washer, and nut items in the container 304, and lists of suppliers for each item. A single tag storing data for each of a plurality of sub-containers storing different types of items simplifies the tracking of item usage when the different types of items are typically extracted from the sub-containers together. While FIG. 3 depicts the container 300 with rectangular shaped sub-containers, other containers are formed with a variety of different geometries to store different items.

Figure 5:
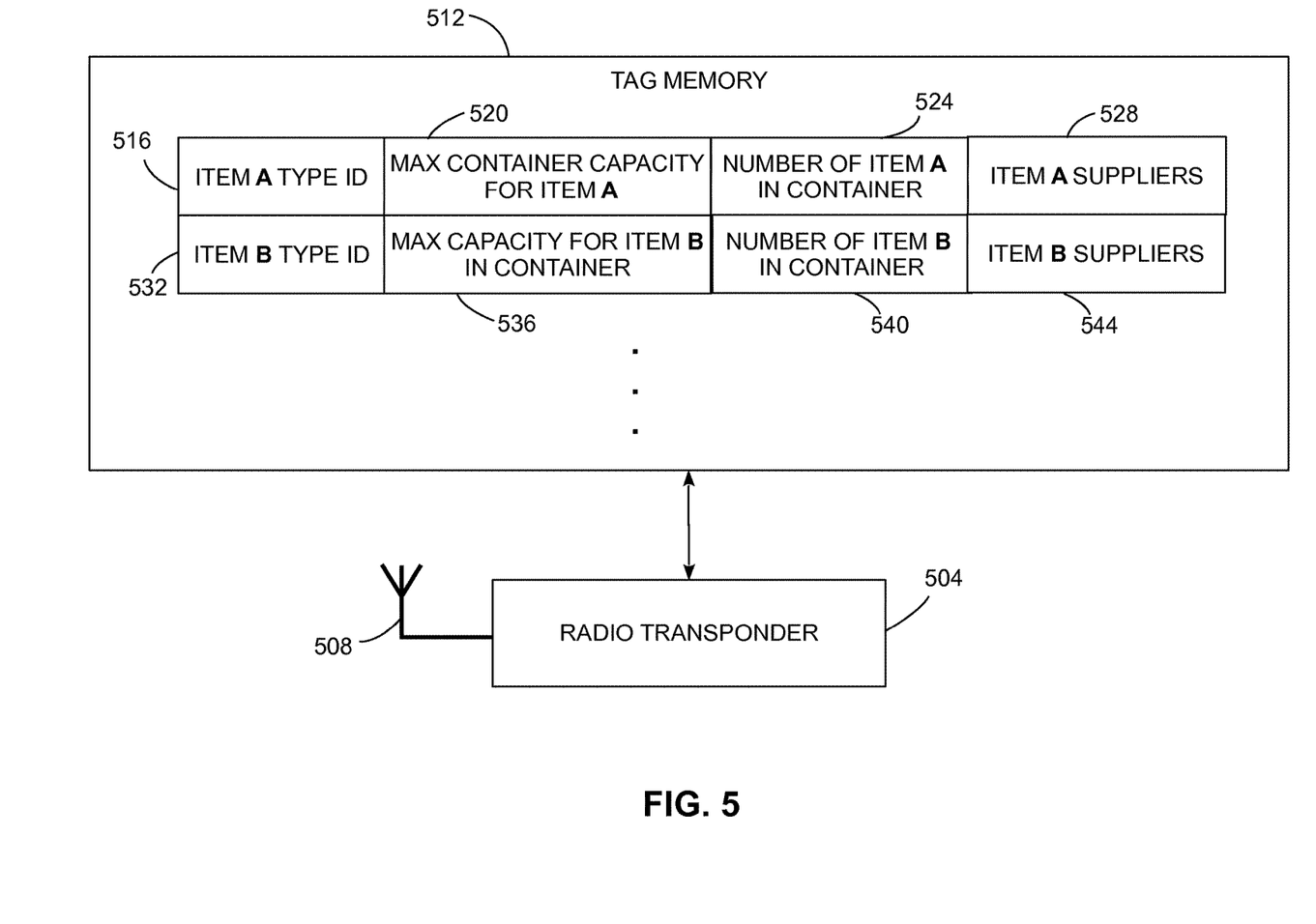
FIG. 5 is a schematic representation of components in a tag including a radio transponder and a memory.

FIG. 5 depicts a schematic diagram of one of the tags depicted in FIG. 2 and FIG. 3. The tag includes a radio transponder 504, antenna 508, and a tag memory 512. The radio transponder 504 receives electrical energy from the sensor 416 in the mobile electronic device 104 through the antenna 508. The radio transponder 504 also exchanges data with the sensor 416 using the antenna 508. The radio transponder is operatively connected to the memory 512 to read and write data to the memory 512.

The memory 512 stores data corresponding to one or more types of item that are stored in a container, including containers with multiple sub-containers, such as the containers depicted in FIG. 2 and FIG. 3. In the configuration of FIG. 5, the memory 512 stores data for two different types of items, which are labeled as item type A and item type B for illustrative purposes in FIG. 5. The memory 512 stores an item type identifier 516, a maximum capacity for item A associated with the container 520, current number of item A stored in the container 524, and an optional list of supplier identifiers 528 that are used to order additional quantities of the item A. Similarly, the memory 512 stores an item type identifier 532, maximum container capacity 536, current number of item B in container 540, and supplier identifiers 544 for the item type B. In alternative embodiments, the tag memory stores additional data about each type of item including, but not limited to, text describing the item, a graphical depiction of the item, a minimum item count number that is used to identify when an order is placed to replenish the container, and a time at which the container was previously stocked with the item.

Figure 7:
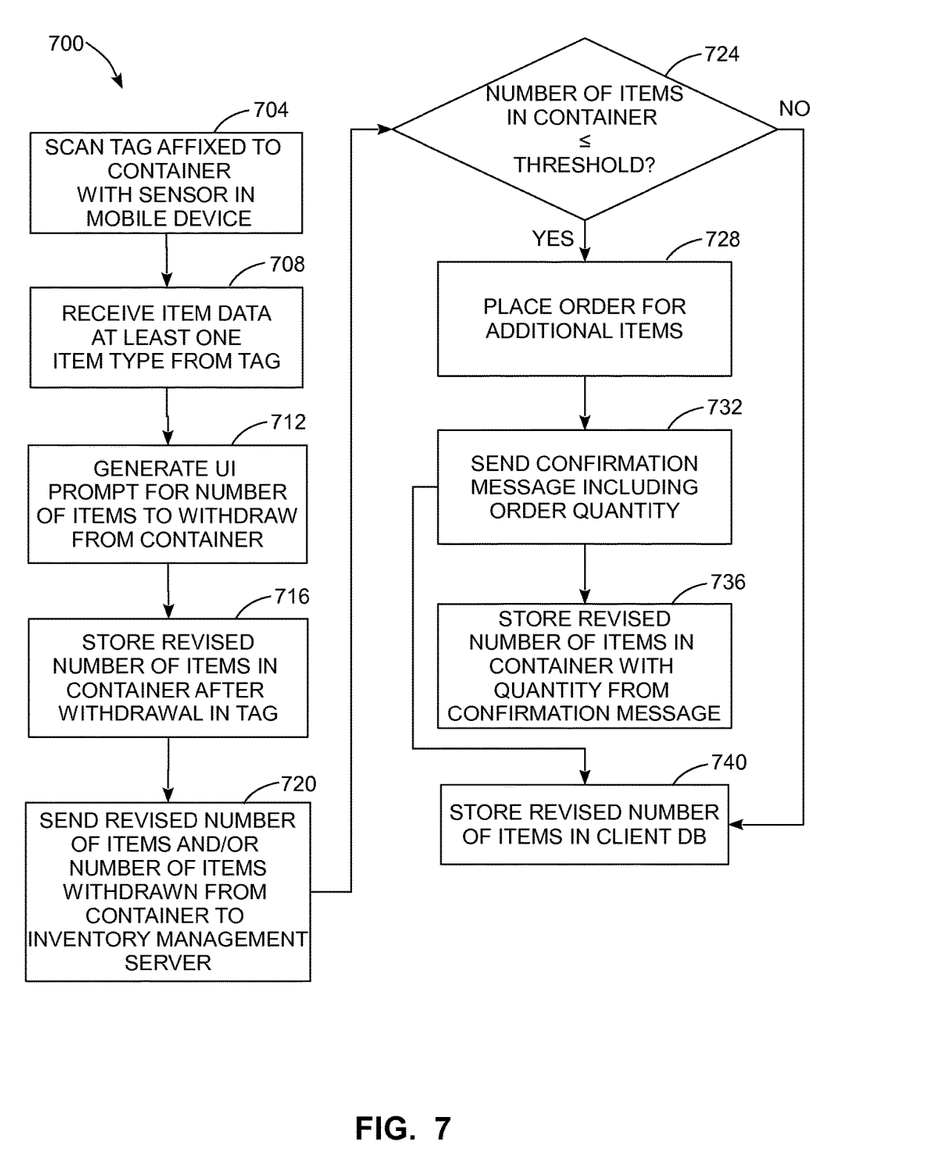
FIG. 7 is a is a block diagram of a process for tracking changes to the number of items in a container.

As described above, the inventory management system 100 enables tracking of the number of items that are withdrawn from each of the containers 136 and optionally enables automated order for replenishment of the items in the containers 136. The inventory management system 100 can further track the cost of the items that are used at the work site with reference to price of each item in order history data and the usage of items at one or more work sites. FIG. 7 depicts a process 700 for tracking the use of one or more types of items stored in one of the tagged containers 136. Process 700 is described in conjunction with the system 100 for illustrative purposes. In the discussion below, a reference to the process 700 performing a function or action refers to one or more processors, such as the processor 404 and processors in the server 108, executing programmed instructions stored in a memory to operate components in the system 100 to perform the function or action.

In process 700, the mobile electronic device 104 reads a tag affixed to one of the containers 136 with the sensor 416 (block 704). As described above, an operator places the mobile electronic device 104 in proximity to a tag in order to receive data in the tag memory from the transponder in the tag, and to transmit data to the tag for storage in the tag memory. The mobile electronic device 104 receives data stored in the tag memory from the tag transponder. Using the tag memory 512 as an example, the mobile electronic device includes identifier data corresponding to one or more types of item in the container, a maximum capacity of the container or sub-containers to hold the items, a number of each item that is presently held in the container, and optionally suppliers for each of type of item held in the container (block 708). As described above, alternative embodiments of the tag memory 512 store additional data, and the mobile electronic device 104 can read some or all of the additional data from the tag memory 512.

Figure 6:
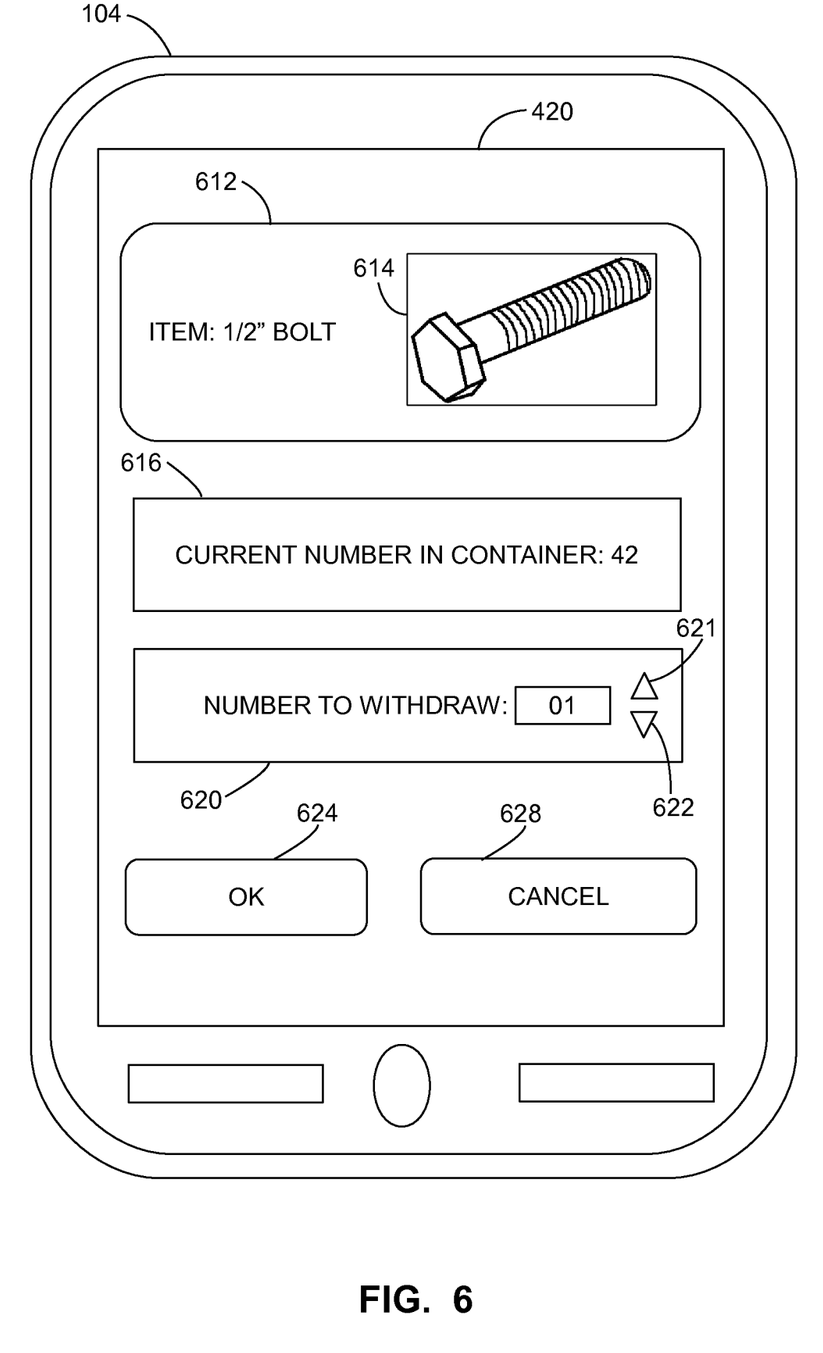
FIG. 6 is a front view of a mobile electronic device and a user interface screen.

In process 700, the mobile electronic device 104 generates a user interface display with the mobile electronic device that prompts the operator to enter a number of items that are withdrawn from the container (block 712). The prompt includes data received from the tag in the container and optionally data received from the inventory management server. As depicted in FIG. 6, a display screen 420 in the mobile electronic device 104 depicts a text description 612 and optional graphic 614 of the type of item stored in the container, a current number of the item in the container 616, a prompt for the number of items to be withdrawn 620, and graphical user interface buttons to accept (button 624) or reject (button 628) the withdrawal. In the example of FIG. 6, the item is a ½" hexagonal head bolt, and the system 100 stores similar descriptions for each type of item stored in the containers 136.

FIG. 6 depicts a single type of item, but a similar interface depicts multiple types of items stored in different sub-containers when the tag memory stores data corresponding to the multiple item types. In one configuration, the multiple items are displayed on a single user interface screen. The user interface prompts for a single number of each type of item to be withdrawn from the sub-containers. Using the container 304 of FIG. 3 as an example, the mobile electronic device 104 reads the data for the bolts, washers, and nuts from the tag 308 and the display 420 prompts the operator for a single number of bolts, washers, and nuts that are withdrawn from each of the sub-containers 312, 316, and 320, respectively. Thus, the operator only has to enter a single number for multiple types of items that are typically withdrawn from a container simultaneously.

In the system 100, the tag includes a numeric or other non-human readable identifier for the type of item stored in the container. In the system 100, the software application in the mobile electronic device 104 retrieves the human-readable text description 612 and the graphic 614 from the item type DB 116 using the item type identifier received from the tag to retrieve the appropriate item description 612 and graphic 614. In another embodiment, the memory 408 in the mobile electronic device 104 stores descriptive text and optionally graphics for some or all of the item types in the containers 136 for use in generating the prompt. Further, some tag embodiments with sufficient memory storage capacity include descriptive text and optionally a graphic in the tag memory, and the mobile electronic device 104 receives the data for the description 612 and graphic 614 from the tag.

The prompt generated on the display 420 also states the number 616 of the type item that is currently held in the container, and a numeric input user interface element 620 for entering a number of the type of item that is to be withdrawn. For example, arrow input buttons 621 and 622 enable incrementing and decrementing, respectively, of the number of items to be withdrawn. Alternatively, a virtual keyboard display or selection box element enables the operator to enter the number of items to be withdrawn. In one embodiment, the maximum number of items to be withdrawn is limited to the current number of items in the container. In another embodiment, if the number of items to be withdrawn exceeds the current number in the container received from the tag, then mobile electronic device 104 generates an order request for additional items that is sent to the inventory management server 108. The operator presses the "OK" button 624 to accept the withdrawal request, and the "CANCEL" button 628 to cancel the request and end process 700. For example, if the mobile electronic device 104 reads an incorrect tag, the item description 612 and item graphic 614 produced on the display has the incorrect type of item and the operator can cancel the withdrawal with the button 628.

Referring again to FIG. 7, the mobile electronic device 104 revises the number of the type of item stored in the container in the tag with the number of the item to be withdrawn entered by the operator (block 716). In the mobile electronic device 104, the processor 404 identifies the total remaining number of items in the container as the count of items for withdrawal entered through the user interface subtracted from the number of items in the container received from the tag during the processing described above with reference to blocks 704 and 708. The tag sensor 416 transmits the revised number of the type of item to the tag and for storage in the tag memory.

In addition to storing the revised number of items in the memory of the tag, the mobile electronic device 104 uses the wireless network adapter 412 to send a message to the server 108 that includes either or both of the revised number of items stored in the container and the number of items that were withdrawn from the container (block 720). In some situations, after sending the revised number of items stored in the container to the inventory management server 108, the revised number of items stored in the container remains greater than a predetermined threshold for the container (block 724). In the inventory management server 108, the message service 112 receives the message from the mobile electronic device 104 and stores the revised number of items in the client DB 128 (block 740). In the system 100, the management terminal 152 can review the revised number of items stored in the container to track the usage of the item types stored in the containers 136.

As process 700 tracks the usage of items stored in the containers, the revised number of an item stored in a particular container is compared to a predetermined threshold (block 724). If the number is less than or equal to the threshold, then the inventory management server 108 orders an additional quantity of the item to replenish the container (block 728). In one configuration, the mobile electronic device 104 determines whether the number of items in the container is less than or equal to the threshold number and sends to the inventory management server 108 an order request, which includes the supplier identifiers for one or more types of item stored in the tag memory. In another configuration, the inventory management server 108 receives the revised number for the type of item from the mobile electronic device 104 and determines that the revised number of the item in the container is below a predetermined quantity stored in the client DB 128. The predetermined threshold is typically greater than zero (e.g., an empty container) to enable the inventory management server 108 to order additional items prior to the container being completely emptied of the identified types of item.

In one configuration of the order processing described with reference to block 728, the message service 112 places the order to replenish the container with reference to quantity and supplier information sent from the mobile electronic device 104 and with reference to the item type DB 116 and supplier DB 124. For example, the message server 112 receives a message from the mobile electronic device indicating that a container with a maximum capacity of fifty ½" bolts is storing five bolts after a withdrawal of bolts from the container. The message also includes supplier identifiers for suppliers that are approved to fulfill a replacement order for the parts. The inventory management server 108 identifies one supplier that has the item available using, for example, an approved supplier that is closest to the location of the mobile electronic device 104 at the work site, a supplier with a greatest specified preference, or a supplier that matches specified criteria such as a supplier that offers the items for a lowest price. In one configuration the inventory management server 108 selects the quantity for the order to refill the container, such as an order for forty-five bolts to refill the container. In another configuration, the message from the mobile electronic device specifies an order amount, and may specify a different quantity for the order. The inventory management server 108 identifies an appropriate item identifier in the item type DB 116 and the messaging service places the order with the supplier-specific order data in the supplier DB 124 with a server operated by the selected supplier 160.

In process 700, the inventory management server 108 sends a confirmation message to the mobile electronic device 104 after ordering the item or items (block 732). The confirmation message identifies the type or types of item that were ordered, quantity of each item type in the order, and includes information about an expected arrival time if the order is delivered to the work site, or a location of the supplier if the order is scheduled for pickup from the supplier. After placing the order, the inventory management server 108 stores revised numbers of each type of item included in the order in the client DB 128 (block 740).

The mobile electronic device 104 receives the confirmation message from the inventory management server 108 with the wireless network adapter 412. In addition to storing the revised number of items in the containers within the inventory management server 108, the mobile electronic device 104 stores the revised number of items in the tag for the container using the quantity information in the received confirmation message (block 736). For example, if the container stores five bolts and the order confirmation indicates an order of forty-five bolts, then the mobile electronic device 104 updates the quantity of bolts in the container to indicate that fifty bolts are currently present in the container. The mobile electronic device 104 displays a prompt to the operator requesting that the mobile electronic device 104 be placed in proximity to the tag to store the revised number of items in the container after receiving the confirmation message. The storage of the revised number of items can occur before or after the bolts in the order are physically received and placed into the container.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for tracking usage of items comprising:
    receiving, with a sensor in a mobile electronic device, data identifying a first type of item stored in a first sub-container in a container, a second type of item stored in a second sub-container in the container, and a single number of the first type of item present in the first sub-container and the second type of item present in the second sub-container from a single tag associated with the container;
    generating, with a user interface in the mobile electronic device, a prompt identifying the first type of item and the second type of item and requesting entry of a single count of the first type of item and the second type of item for removal from the first sub-container and the second sub-container, respectively;
    receiving, from the user interface, the single count of the first type of item and the second type of item; and
    storing in the single tag, with the sensor in the mobile electronic device, a revised single number of the first type of item present in the first sub-container and the second type of item present in the second sub-container, the revised single number being identified with reference to the single count received from the user interface and the single number of the first type of item present in the first sub-container and the second type of item present in the second sub-container received from the single tag.

2. The method of claim 1 further comprising:
    transmitting, with a wireless network adapter in the mobile electronic device, the data identifying the first type of item, the second type of item, and the single count received from the user interface to an inventory management server.

3. The method of claim 1 further comprising:
    transmitting, with a wireless network adapter in the mobile electronic device, the data identifying the first type of item, the second type of item, and the revised single number to an inventory management server.

4. The method of claim 3 further comprising:
    generating, with the inventory management server, an order for the first type of item and the second type of item in response to the revised single number being below a predetermined threshold; and
    sending, with the inventory management server, the order to a server operated by a supplier to order the first type of item and the second type of item for replenishment of the container.

5. The method of claim 4 further comprising:
    receiving, with the sensor in the mobile electronic device, data from the single tag identifying a maximum number of the first type of item and the second type of item that the container is configured to store;

transmitting, with the wireless network adapter in the mobile electronic device, the maximum number to the inventory management server;

identifying, with the inventory management server, a quantity of the first type of item and a quantity of the second type of item to be ordered with reference to the revised single number and the maximum number; and generating, with the inventory management server, the order for the first type of item and the second type of item including the identified quantity to be ordered.

6. The method of claim 4 further comprising:

receiving, with the wireless network adapter in the mobile electronic device, a confirmation message from the inventory management server identifying the first type of item stored in the first sub-container and the second type of item stored in the second sub-container and a quantity of the first type of item and the second type of item in the order; and storing, with the sensor in the mobile electronic device, another revised single number of the first type of item present in the first sub-container and the second type of item present in the second sub-container in the single tag with reference to the quantity in the confirmation message.

7. A system for tracking usage of items comprising:

a container including a first sub-container configured to hold a first type of item and a second sub-container configured to hold a second type of item;

a single tag affixed to the container and configured to store data corresponding to the first type of item stored in the first sub-container and the second type of item stored in the second sub-container; and a mobile electronic device having a processor and memory, a software application program includes programmed instructions stored in the memory of the mobile electronic device that the processor executes to operate the mobile electronic device to:

receive, with a sensor in a mobile electronic device, data identifying the first type of item stored in the first sub-container, the second type of item stored in the second sub-container, and a single number of the first type of item present in the first sub-container and the second item present in the second sub-container from the single tag;

generate, with a user interface in the mobile electronic device, a prompt identifying the first type of item and the second type of item and requesting entry of a single count of the first type of item and the second type of item for removal from the first sub-container and the second sub-container, respectively;

receive, from the user interface, the single count of the first type of item and the second type of item; and store in the single tag, with the sensor, a revised single number of the first type of item present in the first sub-container and the second type of item present in the second sub-container, the revised single number being identified with reference to the single count received from the user interface and the single number of the first type of item present in the first sub-container and the second type of item present in the second sub-container received from the single tag.

8. The system of claim 7, the software application program includes further instructions stored in the memory of the mobile electronic device that the processor executes to operate the mobile electronic device to:

transmit, with a wireless network adapter in the mobile electronic device, the data identifying the first type of item, the second type of item, and the single count received from the user interface to an inventory management server.

9. The system of claim 7 further comprising:

an inventory management server communicatively coupled to the mobile electronic device through a data network; and the software application program includes further instructions stored in the memory of the mobile electronic device that the processor executes to operate the mobile electronic device to:

transmit, with a wireless network adapter in the mobile electronic device, the data identifying the first type of item, the second type of item, and the revised single number to an inventory management server.

10. The system of claim 9, the inventory management server being further configured to:

generate an order for the first type of item and the second type of item in response to the revised single number being below a predetermined threshold; and send the order to a server operated by a supplier to order the first type of item and the second type of item for replenishment of the container.

11. The system of claim 10, the software application program includes further instructions stored in the memory of the mobile electronic device that the processor executes to operate the mobile electronic device to:

receive, with the sensor, data from the single tag identifying a maximum number of the first type of item and the second type of item that the container is configured to store; and transmit, with the wireless network adapter, the maximum number to the inventory management server; and the inventory management server is further configured to:

identify a quantity of the first type of item and the second type of item to be ordered with reference to the revised single number and the maximum number; and generate the order for the first type of item and the second type of item including the identified quantity to be ordered.

12. The system of claim 10, the software application program includes further instructions stored in the memory of the mobile electronic device that the processor executes to operate the mobile electronic device to:

receive, with the wireless network adapter, a confirmation message from the inventory management server identifying the first type of item stored in the first sub-container, the second type of item stored in the second sub-container, and a quantity of the first type of item and the second type of item in the order; and store, with the sensor, another revised single number of the first type of item and the second type of item present in the container in the single tag with reference to the quantity in the confirmation message.

13. The system of claim 7, the single tag further comprising:

a memory configured to store the data corresponding to the type of item stored in the container; and a radio transponder communicatively connected to the memory.

14. The system of claim 7, the single tag including a short range communication protocol.

15. The system of claim 14, the single tag being a near field communication (NFC) tag.

\* \* \* \* \*